(12) United States Patent
Omersa

(10) Patent No.: US 11,837,757 B2
(45) Date of Patent: Dec. 5, 2023

(54) CHEMICAL REACTOR FOR CONTROLLED TEMPERATURE GAS PHASE OXIDATION REACTIONS

(71) Applicant: OMNAGEN LIMITED, Hertfordshire (GB)

(72) Inventor: Kenneth Omersa, Hertfordshire (GB)

(73) Assignee: OMNAGEN LIMITED, Hertfordshire (GB)

( * ) Notice: Subject to any disclaimer, the term of this patent is extended or adjusted under 35 U.S.C. 154(b) by 522 days.

(21) Appl. No.: 17/254,764

(22) PCT Filed: May 21, 2019

(86) PCT No.: PCT/EP2019/063125
§ 371 (c)(1),
(2) Date: Dec. 21, 2020

(87) PCT Pub. No.: WO2020/015892
PCT Pub. Date: Jan. 23, 2020

(65) Prior Publication Data
US 2021/0280881 A1    Sep. 9, 2021

(30) Foreign Application Priority Data

Jul. 17, 2018    (GB) ..................................... 1811680

(51) Int. Cl.
*H01M 8/04089*    (2016.01)
*C25B 1/23*    (2021.01)
(Continued)

(52) U.S. Cl.
CPC .......... *H01M 8/04089* (2013.01); *C25B 1/02* (2013.01); *C25B 1/23* (2021.01); *C25B 9/23* (2021.01);
(Continued)

(58) Field of Classification Search
CPC ......... H01M 8/04089; H01M 8/04201; H01M 8/04738; H01M 8/0625; H01M 8/0637;
(Continued)

(56) References Cited

U.S. PATENT DOCUMENTS 6,700,000 B1    3/2004 Heidemann et al.
2003/0228504 A1* 12/2003 Konrad ................... B60L 58/34
429/513
(Continued)

FOREIGN PATENT DOCUMENTS

EP    0438902    7/1991
GB    2446950    2/2008
(Continued)

OTHER PUBLICATIONS

Combined Search and Examination Report, EPO Application No. 1811680.6 dated Jan. 18, 2019, 5 pages.
(Continued)

*Primary Examiner* — Matthew J Merkling
(74) *Attorney, Agent, or Firm* — Quarles & Brady LLP

(57) ABSTRACT

A chemical reactor includes one or more solid oxide fuel cells, each cell having an electrolyte layer joining a cathode and an anode, the one or more fuel cell cathodes being located in a first gas zone of the reactor, and the one or more fuel cell anodes being located in a second gas zone of the reactor. The chemical reactor further includes a first gas supply route for supplying a flow of oxidant to the first gas zone. The chemical reactor further includes a second gas supply route for supplying a flow of reactant to the second gas zone. The chemical reactor further includes a gas removal route for removing a flow of reaction products away from the second gas zone. The chemical reactor further includes one or more leakage paths which fluidly connect the first gas zone to the second gas zone such that a leakage
(Continued)

flow of oxidant leaks from the first gas zone into the second gas zone to support a direct exothermic chemical reaction between the oxidant and the reactant, while substantially preventing a reverse flow of reactant into the first gas zone. The reaction products are a mixture of reaction product from the direct reaction and reaction product from an indirect electrochemical oxidation reaction of the reactant at the anode or anodes. The reactor further includes a catalyst in the second gas zone for catalysing the direct reaction, and a controller for drawing a controlled electric current from the fuel cell or cells to control the rate of the indirect reaction and thereby the temperature of the catalyst.

18 Claims, 7 Drawing Sheets

(51) Int. Cl.
| | | |
|---|---|---|
| *C25B 13/07* | (2021.01) | |
| *C25B 9/70* | (2021.01) | |
| *C25B 9/23* | (2021.01) | |
| *C25B 1/02* | (2006.01) | |
| *C25B 15/02* | (2021.01) | |
| *H01M 8/04082* | (2016.01) | |
| *H01M 8/04701* | (2016.01) | |
| *H01M 8/0612* | (2016.01) | |
| *H01M 8/0637* | (2016.01) | |
| *H01M 8/2425* | (2016.01) | |
| *H01M 8/12* | (2016.01) | |

(52) U.S. Cl.
CPC ............... *C25B 9/70* (2021.01); *C25B 13/07* (2021.01); *C25B 15/02* (2013.01); *H01M 8/04201* (2013.01); *H01M 8/04738* (2013.01); *H01M 8/0625* (2013.01); *H01M 8/0637* (2013.01); *H01M 8/2425* (2013.01); *H01M 2008/1293* (2013.01)

(58) Field of Classification Search
CPC ........ H01M 8/2425; H01M 2008/1293; C25B 1/23; C25B 9/70; C25B 9/23; C25B 1/02; C25B 15/02
See application file for complete search history.

(56) References Cited

U.S. PATENT DOCUMENTS

| | | | |
|---|---|---|---|
| 2004/0081871 A1 | 4/2004 | Kearl et al. | |
| 2006/0228596 A1* | 10/2006 | Campbell | H01M 8/04701 |
| | | | 429/444 |
| 2008/0029388 A1 | 2/2008 | Elangovan et al. | |
| 2009/0214906 A1* | 8/2009 | Reiser | H01M 8/04216 |
| | | | 429/429 |
| 2010/0086822 A1* | 4/2010 | Omersa | H01M 8/2428 |
| | | | 429/524 |
| 2012/0040258 A1 | 2/2012 | Konrad et al. | |

FOREIGN PATENT DOCUMENTS

| | | |
|---|---|---|
| WO | WO-2004-066467 A2 | 8/2004 |
| WO | WO-2011-015261 A1 | 2/2011 |
| WO | WO-2015-048626 A2 | 4/2015 |

OTHER PUBLICATIONS

International Search Report and Written Opinion, International Application No. PCT/EP2019/063125, dated Sep. 19, 2019, 12 pages.

* cited by examiner

CHEMICAL REACTOR FOR CONTROLLED TEMPERATURE GAS PHASE OXIDATION REACTIONS

RELATED APPLICATIONS

This application is a 35 U.S.C. § 371 national phase application of PCT/EP2019/063125 (WO-2020-015892-A1), filed on May 21, 2019, entitled "CHEMICAL REACTOR FOR CONTROLLED TEMPERATURE GAS PHASE OXIDATION REACTIONS", which claims the benefit of GB Patent Application No. 1811680.6, filed Jul. 17, 2018, each of which are incorporated herein by reference in their entirety.

The present disclosure relates to a chemical reactor which includes one or more solid oxide fuel cells or one or more solid oxide electrolyser cells.

Elevated temperature gas phase reactors typically use a catalyst on a support material. The temperature, pressure and flow rate are then selected to achieve the best conversion rate. Several passes may be required. Some of these reactions consume huge amounts of energy e.g. steam methane reforming (SMR) to produce syngas, and steam cracking to produce ethylene.

Other reactions are very exothermic, producing a lot of mainly wasted heat. An example is the oxidation of ammonia to nitric oxide as part of the manufacture of nitric acid. Localised heating can also cause catalyst degradation. U.S. Pat. No. 6,700,000 proposes one solution for the production of phthalic anhydride, which involves putting the least active catalyst at the fuel inlet, and then increasing the catalyst activity as the fuel is consumed.

New micro-reactors, which have smaller channels, a higher surface area of catalyst, and metal substrates to conduct heat away, address some of these issues. However, electrochemical reactors can provide a more comprehensive solution.

Solid Oxide Cells (SOCs) are a well-established technology, operating at elevated temperatures, usually above 500° C. Typically they consist of an electrolyte, which conducts oxygen ions but is an electrical insulator, an anode and a cathode. Fuel is oxidised at the anode, and the oxidant reduced at the cathode.

Variant forms of SOC may have proton-conducting electrolytes which are typically based on oxide materials, but which can operate at lower temperatures.

In the majority of applications, SOCs are operated in fuel cell mode, acting as solid oxide fuel cells (SOFCs), where fuel is supplied to the anode, and oxidant, typically air, is supplied to the cathode. A potential is built up across the electrolyte, and this can be used to drive an external electrical circuit.

However, SOCs can also be used as electrolysers. An electrical potential is applied across the electrodes, and this can drive a reaction which is not thermodynamically favoured. In this mode they are referred to as Solid Oxide Electrolyser Cells (SOECs), and high temperature electrolysis of carbon dioxide and steam is one application.

The prime purpose of SOFCs is to generate electricity, which they do very efficiently, but in the process they also convert chemicals, for example methane and air to provide carbon dioxide and water.

Conventional SOFCs are usually of the 'twin-chamber' type where the fuel and oxidant are kept separate, and the electrolyte is fully dense to prevent them mixing. WO2015048626 proposes the use of 'twin-chamber' SOFCs for use in chemical processing, combined with anode gas processing equipment. This approach provides improved chemical efficiency, and lower electrical efficiency than a conventional SOFC system. However, it may be complex, expensive, and difficult to operate to achieve high flow rates.

Thus a 'single-chamber' electrochemical reactor has many advantages, as outlined in GB2446950. The direct reaction of fuel and oxidant is exothermic, and maintains the temperature needed for the SOFC to operate. A mixture of fuel and oxidant helps suppress unwanted reactions such as coking at the anode when oxidising hydrocarbons. It is also much simpler and less expensive than 'twin-chamber' fuel cells.

However, conventional 'single-chamber' fuel cells have their own problems. First, combining fuel and oxidant can produce explosive mixtures. Secondly, it can be difficult to control the balance between direct, and electrochemical reactions.

The present invention is at least partly based on a realisation that these problems can be addressed by using a hybrid chemical reactor, which is a combination of a conventional chemical reactor, and an electrochemical reactor. This enables a simple design, which requires no seals, and therefore can be manufactured economically.

Accordingly, the present invention provides in a first aspect a chemical reactor including:

one or more solid oxide fuel cells, each cell having an electrolyte layer joining a cathode and an anode, the one or more fuel cell cathodes being located in a first gas zone of the reactor, and the one or more fuel cell anodes being located in a second gas zone of the reactor;

a first gas supply route for supplying a flow of oxidant to the first gas zone;

a second gas supply route for supplying a flow of reactant to the second gas zone; and a gas removal route for removing a flow of reaction products away from the second gas zone; and one or more leakage paths (i.e. gas feeds) which fluidly connect the first gas zone to the second gas zone such that a leakage flow of oxidant (i.e. a flow which subsidiary to the main flows of the first gas supply route, the second gas supply route and the gas removal route) leaks from the first gas zone into the second gas zone to support a direct exothermic chemical reaction (i.e. a controlled amount of reaction which is subsidiary to the indirect electrochemical oxidation reaction discussed below) between the oxidant and the reactant, while substantially preventing a reverse flow of reactant into the first gas zone;

wherein the reaction products are a mixture of reaction product (i.e. output) from the direct reaction and reaction product (i.e. output) from an indirect electrochemical oxidation reaction of the reactant at the anode or anodes; and wherein the reactor further includes a catalyst in the second gas zone for catalysing the direct reaction, and a controller for drawing a controlled electric current from the fuel cell or cells to control the rate of the indirect reaction and thereby the temperature of the catalyst.

Thus, advantageously, the reactor enables temperature control of the catalyst and hence control of the balance between direct and electrochemical reactions, while also avoiding explosive mixtures.

The chemical reactor of the first aspect may have any one or any combination of the following optional features.

Typically, the gas removal route is a second gas removal route, the device further including a first gas removal route for removing a flow of gas depleted in oxidant away from the first gas zone.

The controller may further control the flow rates of the oxidant and the reactant to respectively the first and second gas zones to control the rate of the direct reaction. The controller may further control a flow rate at which the reaction products are extracted from the reactor.

The oxidant may be oxygen, e.g. in the form of air or pure oxygen.

The catalyst may be a catalyst in the anode or anodes which also catalyses the indirect reaction. Alternatively, the catalyst may be a first catalyst, and the reactor may further include a second catalyst in the anode or anodes which catalyses the indirect reaction.

The present invention also provides in a second aspect a chemical reactor including:
- one or more solid oxide electrolyser cells, each cell having an electrolyte layer joining a cathode and an anode, the one or more electrolyser cells being located in a gas reaction zone of the reactor;
- a first gas supply route for supplying a flow of reductant and oxidant gases to the gas reaction zone such that both the cathode and the anode of each cell are exposed to the flow of reductant and oxidant;
- a gas removal route for removing a flow of reaction product from the gas reaction zone; and
- a second gas supply route for supplying a flow of oxygen to the gas reaction zone such that the oxygen supports a direct exothermic chemical reaction between the oxygen and the reductant gas;
- wherein the reaction products are a mixture of reaction product (i.e. output) from the direct reaction, reaction product (i.e. output) from an indirect electrochemical reduction reaction of the oxidant at the cathode or cathodes, and reaction product (i.e. output) from an indirect electrochemical oxidation reaction of the reductant at the anode or anodes; and
- wherein the reactor further includes a catalyst in the gas reaction zone for catalysing the direct reaction, and a controller for applying a controlled electric potential to the electrolyser cell or cells to control the rate of the indirect reactions and thereby the temperature of the catalyst.

Thus this aspect uses electrolyser cells rather than fuel cells, but again the reactor enables temperature control of the catalyst and hence control of the balance between direct and electrochemical reactions.

The chemical reactor of the second aspect may have any one or any combination of the following optional features.

Typically, the gas removal route is a first gas removal route, the device further including a second gas removal route for removing a flow of unused oxygen away from the gas reaction zone.

The controller may further control the respective flow rates of the reductant gas, oxidant gas and oxygen to the gas reaction zone to control the rate of the direct reaction. The controller may further control a flow rate at which the reaction products are extracted from the reactor.

The reductant may be hydrocarbon gas, the oxidant may be carbon dioxide, and the reaction products may be a mixture of hydrogen and carbon monoxide.

The oxygen may be in the form of air or pure oxygen

The catalyst may be a catalyst in the anode or anodes which also catalyses the indirect oxidation of the reductant gas. Alternatively, the catalyst may be a first catalyst, and the reactor may further include a second catalyst in the anode or anodes which catalyses the indirect oxidation of the reductant gas.

The chemical reactor of the first or second aspect may have any one or any combination of the following optional features.

When the catalyst is a first catalyst, this may be coated on surfaces of the reactor. Alternatively or additionally, first catalyst may be incorporated in structural material of the reactor.

The chemical reactor may further include one or more temperature measuring devices arranged to monitor the reactor temperature, and to communicate the reactor temperature to the controller for use in controlling the rate of the direct reaction and/or the indirect reaction(s).

The chemical reactor may further include one or more gas composition measuring devices arranged to monitor the composition of the reaction products, and to communicate the composition to the controller for use in controlling the rate of the direct reaction and/or the indirect reaction(s).

Embodiments of the present disclosure will now be described by way of example with reference to the accompanying drawings in which.

1. REACTOR

Figure 1:
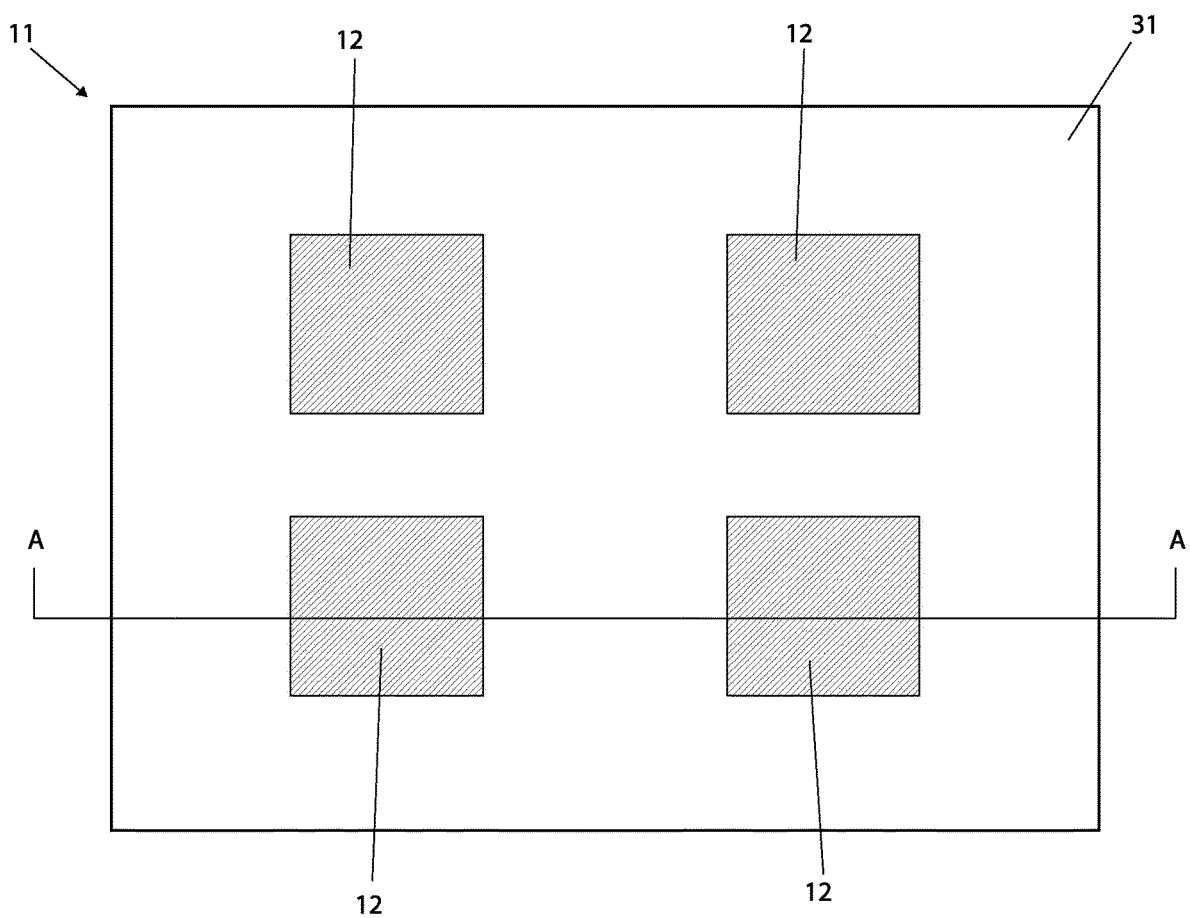
FIG. 1 shows schematically a plan view of an element of a hybrid chemical reactor device.

FIG. 1 shows schematically a plan view of a reactor element 11 of a hybrid chemical reactor device. The element 11 comprises a conductor 31 on which are located four SOFCs 12, but there may be any number. The conductor may be formed, for example, of metal such as AISI 430 ferritic stainless steel, and may be about 100 μm thick.

Figure 2:
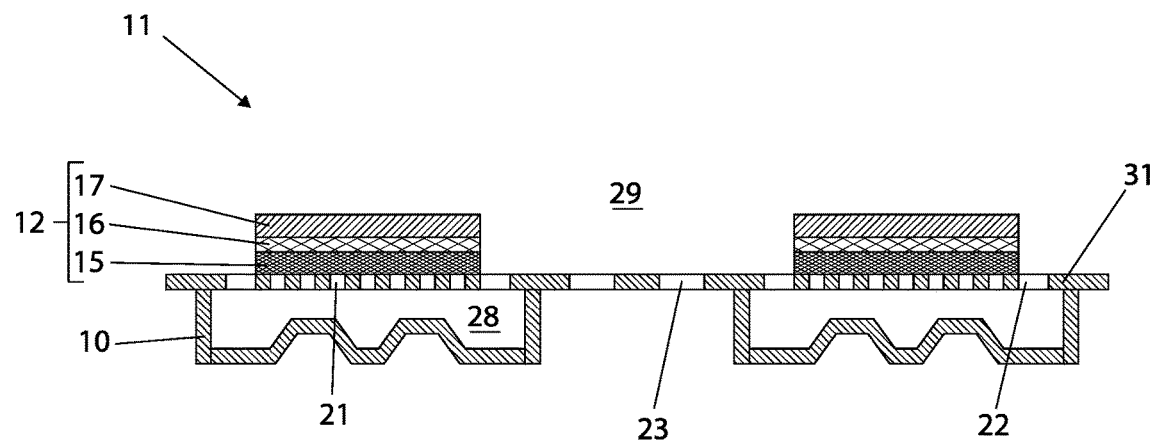
FIG. 2 shows a section A-A of FIG. 1.

FIG. 2 shows a section A-A of FIG. 1. Each SOFC 12 comprises an electrolyte layer 16 sandwiched between a cathode layer 15, and an anode layer 17. Each electrolyte may be gas tight or porous, as long as it prevents the two electrodes on either side from short-circuiting.

A portion of the conductor 31 forms a wall of each conduit 10, which forms a gas flow passage defining a first gas zone 28 for supplying a flow of oxidant, which is usually air or oxygen, but may be another gas such as nitric oxide, via pores 21 of porous regions to the cathode 15 of each SOFC. The pores 21 are produced in the conductor 31, e.g. by etching, or laser or mechanical drilling. Another option is to press slots in the metal of the conductor 31 so that the pressed metal forms turbulence-inducing tabs adjacent the slots projecting into the gas flow passage 28, thereby improving gas flow to the cathode 15. The pores may be about 100 μm in diameter, and may be similarly spaced from each other in order to both support the SOFCs, and provide enough porosity for the oxygen to reach the cathode 15.

The cathode layers 15 may be deposited before or after the pores 21 are made in the conductor 31. If the layers are deposited after the pores are produced, the cathode 15 may be partially or totally contained by the pores.

A second gas zone 29 surrounds the conduits 10 and receives the reactant, typically a hydrocarbon or oxygenated hydrocarbon. However, the reactant may include other species, such as ammonia for use in ammoxidation reactions. When there are plural species in the reactant they may flow into the second gas zone 29 from separate pathways, and only mix on arrival therein.

The layers of SOFCs 12 can be applied and sintered to the conductor 31, and then heat treated. The conductors 31 may be made from foil, and the pores produced by techniques such as etching or drilling, or they may be formed from expanded metal or wire mesh. However, if a ceramic material or materials is used to form the conductors 31, then the layers of the SOFCs 12 may be sintered on the ceramic, without a need for inert gas or vacuum heat treatment, which is typically required when sintering onto metals. Alternatively, the layers of the SOFCs 12 may be produced as sheets, cut to size and then fired. They can then be clamped in place within a stack.

Further, uncovered holes 22 in the first conductor 31 adjacent to each SOFC 12 ensure that the contents of the gas flow passage 28 leak across to the second gas zone 29 in which the SOFCs 12 are located. The amount of this leakage through the holes 22 is dependent on the flow area of the holes 22 (which may be relatively large, e.g. about 1 cm in diameter) and the pressure difference between the first and the second gas zones. The leakage determines the amount of direct reaction, and therefore the level of heat generated. The SOFC cathode 15 reduces oxygen to oxygen ions, which pass through the electrolyte 16, and then oxidise the reactant to the product. A potential is generated across the electrodes, so some of the energy can be removed as electricity, thereby controlling the temperature, to prevent overheating. The electricity produced makes the reaction more sustainable.

In a different configuration, the order of the layers in each SOFC can be reversed so that the anode layer 17 lies directly on top of the pores 21 of the porous region of the conductor 31, and is then overlaid in turn by the electrolyte layer 16 and the cathode layer 15. The second gas zone 29 then becomes the gas flow passages formed by the conduits 10, while the first gas zone 28 becomes the space surrounding the conduits 10.

The conductor 31 provides an electrical connection between the cathodes 15. When two elements 11 are stacked, the upper element 11 electrically connects the anodes 17 below, and connects the two elements in series. The holes 23 allow gases to readily pass through the conductor 31, and an easy exchange of gases within the second gas zone 29.

A catalyst is essential to ensure the correct reaction product. The fuel cell anode 17 will generally contain a catalyst for the electrochemical oxidation, and it may optionally contain a catalyst for the direct oxidation reaction. These catalysts may, or may not, be the same. The direct oxidation catalyst may also be coated on other reactor surfaces, or be incorporated in the reactor structural components.

Many catalysts operate most effectively within a particular temperature range. This invention allows electricity to be drawn from the fuel cells to remove energy, thereby controlling the reactor temperature. The reactor temperature and/or the composition of the reaction products can be monitored, to provide information to a controller to allow it to maintain the optimum temperature.

In a variant, the reactor acts as an electrolyser, and the cells are SOECs. The SOECs also comprise a cathode, electrolyte and anode. However, in this variant the cathodes and the anodes of the SOECs are both supplied with a mixture of reductant and oxidant, and thus it is not necessary for the reactor to distinguish first and second gas zones. A potential is applied to drive the reactions. Catalysts are generally required for these reactions in the same way as the SOFC variant. The reactor has an oxygen gas supply route so that a controlled amount of oxygen (e.g. as air or pure oxygen) can bleed into the mix of reductant and oxidant. The direct oxidation reaction between the oxygen and reductant is catalysed and produces a product and heat. The heat maintains the reactor temperature. This can be controlled in a similar manner to the SOFC variant.

2. REACTIONS

A wide range of gas phase reactions can be controlled in a hybrid chemical reactor device, with the additional benefit of generating electricity. The types of reaction are described here.

2.1 Fuel Cell: Full Oxidation

Full oxidation of hydrocarbons, and oxygenated hydrocarbons, provides carbon dioxide, steam, heat and electricity. The hybrid chemical reactor device can be used in this application, and provides a large amount of electrical power in a small volume.

One application for this format is auxiliary power units in vehicles. Exhaust gases from an internal combustion engine are mixed with more fuel, and these gases pass through the fuel cell stack. The conduit 10 supplies air. Some air bleeds into the fuel and exhaust gas mix, with a direct reaction maintaining the temperature. Most oxygen reacts electrochemically with the fuel to generate electricity, which can be used to top up the battery in hybrid vehicles, or to directly power equipment such as air conditioning units.

2.2 Fuel Cell: Partial Oxidation

There is a huge range of chemicals which are made by the addition of oxygen to a molecule. Many of these are carried out, or are capable of being carried out, at elevated temperature in the gas phase. Several are very exothermic; the heat generated making the reaction difficult to control, and hotspots accelerate catalyst degradation. The excess heat is usually wasted.

Carrying the reaction out in a hybrid chemical reactor device allows a combination of some direct reaction to provide enough heat to maintain the reaction temperature, and an electrochemical reaction to remove energy as electricity. This allows catalysts to operate at their optimum temperature, and provides electricity as a by-product, making the reaction more sustainable.

The oxidant will usually be air or oxygen, and the 'fuel' will be the reactant. The conduit can be supplied with either the oxidant or the fuel. Fuel is supplied to the anode, and oxidant to the cathode.

In most cases there are a number of possible reaction products, so a selective catalyst is essential. The support material, usually a ceramic such as silica or alumina, can also play a significant role. Below is a list of some major chemicals, and example catalysts used in their manufacture:

Nitric oxide from ammonia, part of nitric acid manufacture: platinum/rhodium alloy.
Syngas (carbon monoxide and hydrogen) from methane: nickel.
Formaldehyde from methanol: silver.
Maleic anhydride from benzene: vanadium pentoxide plus molybdenum trioxide.
Ethylene oxide from ethylene: silver on an aluminium oxide support plus promoters and inhibitors.

Acrylic acid from propene: molybdebum-vanadium-copper-oxide on a silicon carbide support.

Phthalic anhydride from o-xylene or naphthalene: vanadium pentoxide on a support such as alumina or silicon carbide.

In addition, terephthalic acid, adipic acid and phenol are currently made by liquid phase reactions, but the thermodynamics of the oxidation reactions used in their manufacture, means they are candidates for manufacture in the hybrid chemical reactor of this invention.

The addition of some steam may assist the kinetics of some of the reactions.

2.3 Fuel Cell: Ammoxidation

This is similar to partial oxidation, but with ammonia mixed with the fuel. An example reaction and catalyst is:

Acrylonitrile from propene: bismuth-phosphomolybdate combination.

2.4 Fuel Cell: Oxy-Dehydrogenation

Oxy-dehydrogenation involves eliminating some hydrogen from a molecule, and oxidising the hydrogen to water, for example ethane to ethylene. Controlling the reaction in the hybrid chemical reactor helps to produce the correct product as well as electricity. This contrasts with the existing method of steam cracking at high temperature, which is very energy intensive.

2.5 Electrolyser

In this case the reactions are not thermodynamically favoured, and a potential needs to be applied to drive the reaction. An example is the reaction of carbon dioxide with methane to produce syngas:

$$CH_4 + CO_2 = 2CO + 2H_2$$

There are two problems which need to be overcome, carbon deposition at the electrodes, and maintaining the stack temperature. Supplying oxygen via conduit 10 controls carbon deposition at the electrodes, and allows some direct reaction with methane to maintain the stack temperature.

3. DEVICE CONFIGURATION

Each reactor element 11 has at least one SOFC 12, or in the case of an electrolyser, at least one SOEC. For an SOFC, the cathode 15 is supplied with oxidant from the first gas zone 28 by the pores 21 and the second gas zone 29 receives the reactant. For an SOEC, reductant and oxidant are supplied to both sides of the SOEC.

In the case of SOFCs, the size and/or density of the holes 22 which allow oxidant to leak into the second gas zone 29 may vary for different locations in an element 11 and/or for different elements in a stack of elements. In this way a suitable positive pressure and a suitable local leakage rate of the oxidant can be maintained across all elements of a stack.

In the case of SOFCs, the first 28 and second 29 gas zones can take various forms. For example, they may be configured as linear or non-linear plane tube conduits. They may incorporate baffles to promote turbulent flow. Similar considerations apply to the gas reaction zone in the case of SOECs. The fuel cells or electrolyser cells themselves may be shaped to promote turbulent flow.

In a stack of reactor elements 11, the electrical connections between the SOFCs or the SOECs of a given element need to be maintained, and each element of the stack needs to be electrically connected to the other elements.

Individual elements may be substantially planar. Conduits 10 need to be electrically conducting; this can be achieved by using electrically conducting material, or by applying an electrically conducting coating to a non-conducting material. Elements can be stacked directly on top of each other, and clamped to provide good electrical contact.

As reactant is consumed with greater distance from the inlet, the proportional area of each conductor covered by fuel cells or electrolyser cells may decrease. The porosity, thickness and composition of the electrodes and electrolyte may also change to accommodate lower reactant concentrations.

4. CONDUCTOR AND CONDUIT MATERIALS

Suitable materials for forming the reactor element 11 are discussed in GB A 2446950. In general, however, the materials need to provide:

High temperature corrosion resistance to fuel, oxidant and reaction products.

Strength at temperature, and creep resistance.

Compatibility with adjacent electrode materials.

Materials may also need to be able to catalyse reactions.

High temperature alloys, including stainless steels, nickel, cobalt and titanium alloys, can be used to form the conductors 30, 31 and the conduit 10. These are available as sheet, plate and foil in a wide range of alloy compositions. They can be formed and joined by known techniques. Pores and holes formed by e.g. drilling and photochemical etching. Powder metallurgy manufacturing may be used.

The conductors 30, 31 and conduit 10 may carry coatings to improve corrosion resistance, and/or to reduce contact resistance. They may also be treated or coated to affect its catalytic performance.

A number of ceramics are electrically conducting at elevated temperature. These include carbides such as SiC, ZrC and TiC, nitrides such as TiN, TaN and $Si_3N_4$, Indium tin oxide (ITO), and a range of electrically conducting perovskite materials. Such materials can be used to form at least parts of the conductors 30, 31 and conduit 10.

5. CELL MATERIALS

The electrolyte for the SOFCs and SOECs, should conduct oxygen ions in the temperature range of the reaction, but does not conduct electrons. It should also be chemically stable. Cerium gadolinium oxide (10% Gd) (CGO) can be used below 600° C., and yttria (8 mole %) stabilised zirconia (YSZ) above that temperature. Other electrolyte materials such as doped lanthanum gallates, for example $La_{0.8}Sr_{0.2}Ga_{0.8}Mg_{0.2}O_{3-\delta}$, and scandia stabilised zirconia $(Sc_2O_3)_{0.1}(ZrO_2)_{0.9}$, may be used.

Most SOFCs operate at above 500° C., but the operating temperature can be reduced by reducing the electrolyte thickness. Further reductions, as low as 300° C., can be achieved by using alternative electrolyte materials such as doped bismuth oxides. Examples are erbia (20 mole %) stabilised bismuth oxide, and $Bi_4Mg_{0.26}V_{1.74}O_{10.61}$. These materials can be reduced in normal fuel cell conditions, but the higher oxygen partial pressures in this application can overcome this problem.

Multiple layers of different electrolytes may be used to prevent unwanted reactions between a main electrolyte material and electrode materials. An additional layer may be used to reduce resistance losses at the electrode/electrolyte interface.

The electrodes may be made from a single phase material such as a perovskite, some of which are listed below, or may be a mixture of perovskite and the electrolyte material.

The SOFC cathode reduces the oxidant, e.g. oxygen in air, and conducts oxygen ions and electrons. Example materials for the SOFC cathode are $La_{0.8}Sr_{0.2}MnO_{3-\delta}$ (LSM), $La_{0.6}Sr_{0.4}Co_{0.2}Fe_{0.8}O_{3-\delta}$ (LSCF), $Ba_{0.5}Sr_{0.5}Co_{0.8}Fe_{0.2}O_{3-\delta}$ (BSCF), $GdBaCo_2O_{5+\delta}$ (GBC), $Ba_{0.5}Sr_{0.5}Mn_{0.7}Fe_{0.3}O_{3-\delta}$ (BSMF), and $Sm_{0.5}Sr_{0.5}CoO_{3-\delta}$ (SSC).

The SOEC cathode catalyses a different reaction, and materials such as lanthanum doped strontium titanates for example $La_{0.2}Sr_{0.8}TiO_{3+\delta}$, $La_{0.3}Sr_{0.7}Fe_{0.7}Ti_{0.3}O_{3-\delta}$, and $La_{0.2}Sr_{0.8}Ti_{0.9}Mn_{0.1}O_{3-\delta}$ can be used. Other possible materials include $La_{0.3}Sr_{0.7}Cr_{0.3}Fe_{0.7}O_{3\delta}$, $La_{0.8}Sr_{0.2}Cr_{0.5}Mn_{0.5}O_{3-\delta}$, and $La_{0.65}Sr_{0.30}Ce_{0.05}Cr_{0.50}Fe_{0.50}O_{3-\delta}$.

The anode materials of the SOFC or the SOEC are chosen to selectively oxidise the reactant to the desired product, and also conduct oxygen ions and electrons. A wide range of catalysts are possible, depending on the desired product, as discussed above in sections 2.2 and 2.3. An example is the SOFC anode material for the partial oxidation of methane to syngas, which may be a mixture of nickel with the electrolyte. Other possible materials such as $La_{0.9}Sr_{0.1}Cr_{0.5}Fe_{0.5}O_{3-\delta}$ and $La_{0.9}Sr_{0.1}Cr_{0.7}Fe_{0.3}O_{3-\delta}$ are more redox-stable and sulphur-tolerant alternatives.

Proton conducting SOFCs are less well developed than the better known oxide ion conducting fuel cells, and given that they conduct protons, can be used for carrying out different reactions. They require a different electrolyte, and the most widely used is $BaCeO_3$ with 10% yttria substitution (BCY 10). A typical anode would be a mixture of the electrolyte and Ni, and cathode $Ba_{0.5}Fe_{0.8}Zn_{0.2}O_{3-\delta}$.

Suitable manufacturing methods for the functional layers of the SOFCs and SOECs, such as tape casting and screen printing, are described in GB A 2446950. Spray techniques, such as ultrasonic spraying, may also be used. These methods involve a mixture of the ceramic powder in a solvent with, where necessary, the addition of a surfactant (which acts as a deflocculant), a binder, a plasticiser, and a pore former (which burns out to leave a more gross porosity). 3D printing may also be used.

6. TEMPERATURE CONTROL OF INDUSTRIAL CHEMICAL REACTIONS

Most gas phase oxidation reactions are highly exothermic, and are carried out over a catalyst on a support material. Excessive local temperatures can result in catalyst degradation and unwanted reaction products. The present device allows a combination of the conventional direct reaction by bleeding a controlled amount of oxidant into the reactant through the holes 22, and an electrochemical reaction in the SOFCs 12. Energy is removed as electricity, thereby lowering the process temperature, as well as making the process more sustainable because of the useful energy produced.

The direct reaction catalyst may coat the conductors 31, or the whole conduit 10, so that some of the direct reaction occurs outside the fuel cell. Controlling the oxygen supply determines the extent of the direct reaction, and heat can be conducted away by the conductors. Further electrochemical conversion can then take place in the fuel cell anode, where a current can be drawn from the cell, thus removing energy.

In some reactions it may be possible to prevent a spontaneous direct reaction between the reactant and oxygen until the gases enter the fuel cell anode. In this case there would be no coating of the conductor with catalyst material, and the conductor and conduit material would need to be selected so that it did not catalyse the reaction itself. In this case both the direct and the indirect electrochemical reactions would occur in the fuel cell anode. The catalyst for these reactions may, or may not, be the same.

In each case, the reactant flow, oxygen leakage rate, and the current drawn from the fuel cells can be controlled to provide the optimum temperature for catalyst operation. Conventional techniques for gas flow control can be used to achieve the desired flow rates of gases into and out of the reactor. The controlling measurement may be the temperature at different points in the stack, and/or by monitoring the output gas composition.

7. VARIANT CONVERSION DEVICES

Figure 3:
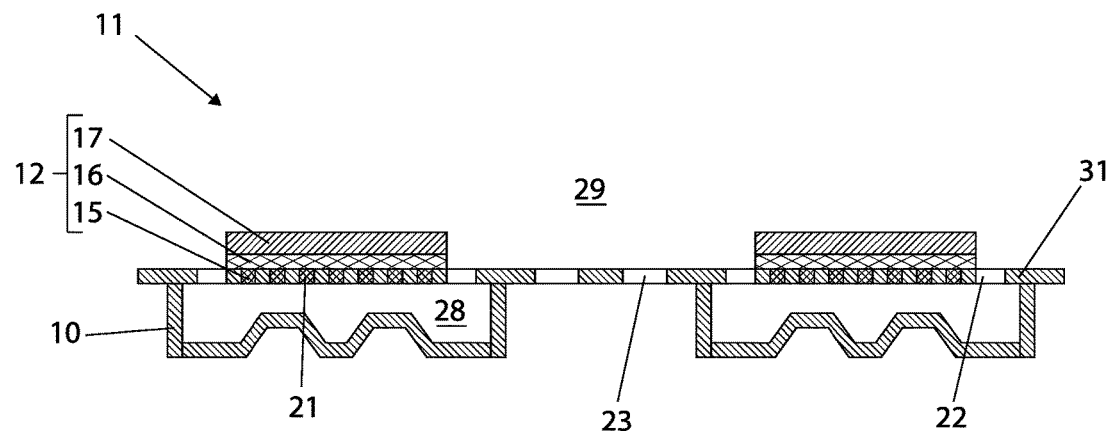
FIGS. 3 to 7 show respective variants of the element of the hybrid chemical reactor device.

The electrolyte 16 of the SOFC may be porous. However, FIG. 3 shows a variant of the element 11 of the hybrid chemical reactor device, in which the electrolyte 16 is fully dense, and seals to the conductor 31, thereby isolating the SOFC cathode 15, which is entirely within the pores 21, from the second gas zone 29. This arrangement is beneficial for cathode materials which cannot tolerate exposure to the reactant.

Figure 4:
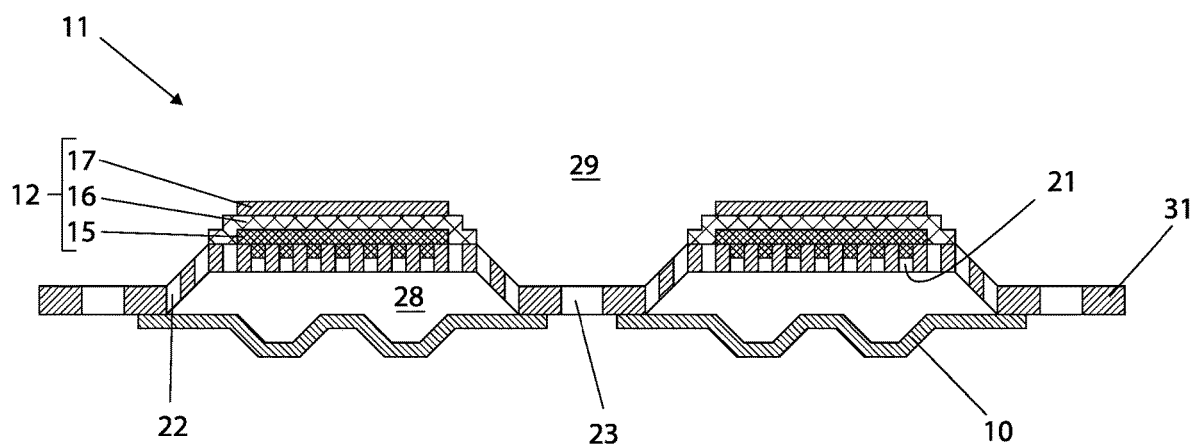

FIG. 4 shows a further variant of the element 11 of the hybrid chemical reactor device, in which the SOFC cathode 15 is partially above, and partially within the pores 21. The electrolyte 16 is fully dense, and seals to the conductor 31, thereby isolating the SOFC cathode 15. The conductor 31 is non-planar, providing a different shaped conduit 10.

Figure 5:
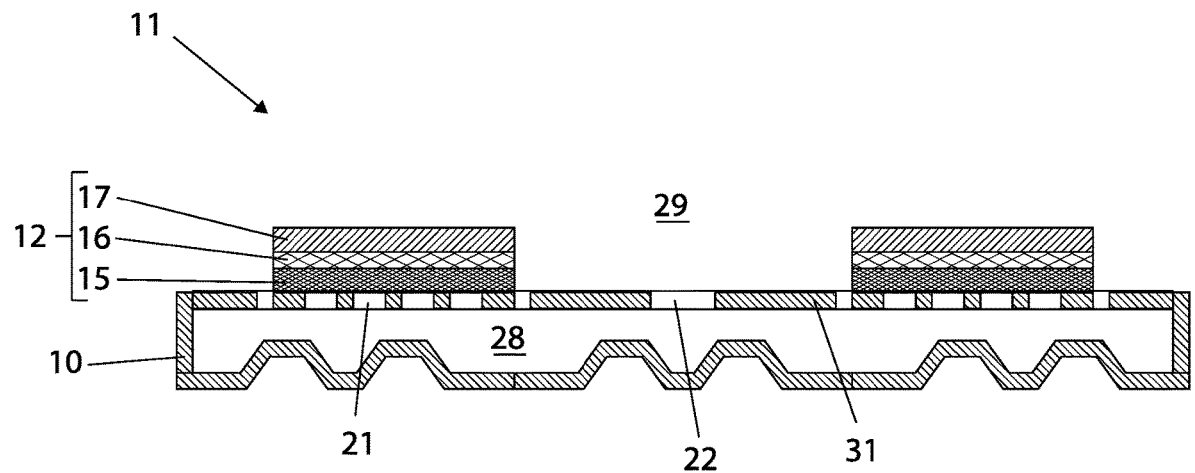

FIG. 5 shows a further variant of the element 11 of the hybrid chemical reactor device, in which the conduit 10 extends below both the SOFCs 12. The conduit 10 can extend below any number of SOFCs 12.

Figure 6:
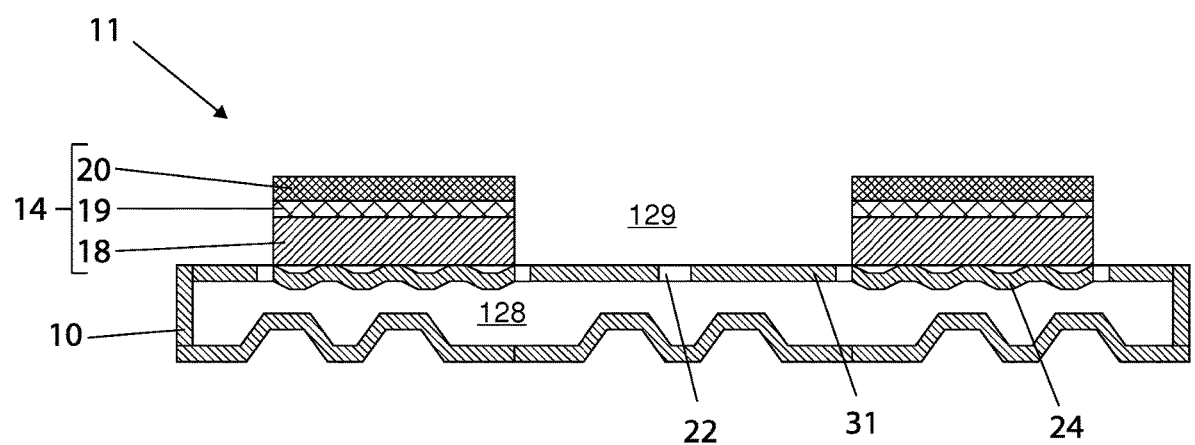

FIG. 6 shows a further variant of the element 11 of the hybrid chemical reactor device, in which the conduit 10 extends below two SOECs 14, comprising an anode 18, electrolyte 19, and cathode 20. The SOEC anode 18 is in contact with the conductor 31. In order that gases can also enter and exit the SOEC anode layer 18, the conductor 31 forms a series of peaks or ridges 24 in the region beneath the anode layer 18. The summits of these peaks or ridges make the electrical connection to the anode layer 18 while the valleys between them provide pathways for gas flow to and from the layer.

A mixture of oxidant and reductant can be fed into the gas reaction zone 129 in which the SOECs 14 are located, and a potential applied to the SOECs to form the reaction products. These reactions are not thermodynamically favoured, and require heat to maintain the reaction. Oxygen is bled in through holes or pores (forming leakage or gas feed paths) 22 from flow passage 128 created by the conduit 10 into the gas reaction zone 129, and the exothermic reaction provides that heat.

The pores 22 fluidly connect the flow passage 128 to the gas reaction zone 129. They allow a leakage flow of oxygen into the gas reaction zone, which flow is subsidiary to the main flows of the first gas supply route which provides the oxidant and reductant, and the gas removal route which removes the reaction product. This leakage flow allows a controlled direct oxidation of the reductant by the oxygen, producing heat and a reaction product.

An application is the electrolysis of a hydrocarbon fuel and carbon dioxide, with the addition of some oxygen. The oxygen in the flow passage 128 bleeds through pores 22 into the gas reaction zone 129 which contains a hydrocarbon fuel such as methane, and carbon dioxide. This results in an exothermic partial oxidation to syngas (carbon monoxide plus hydrogen) which helps to maintain the stack temperature. This direct reaction can be promoted with the use of a catalyst such as nickel, either by coating the outer surface of the conduit 10 with nickel, or by making the conduit out of a nickel containing alloy such as AISI 304 austenitic stainless steel. Some oxygen remains mixed with the fuel to enter the electrodes and inhibit carbon deposition. When a potential is applied across the SOEC 14 cells, the cathode 20 reduces the carbon dioxide, and the anode 18 oxidises the methane to produce more syngas.

The temperature of the electrolyser can be maintained by controlling the flow rates of methane and carbon dioxide, the rate at which oxygen is bled into the reaction zone, and the electric potential applied to the electrolyser. The controlling measurement may be the temperature at different points in the stack, and/or by monitoring the output gas composition.

Figure 7:
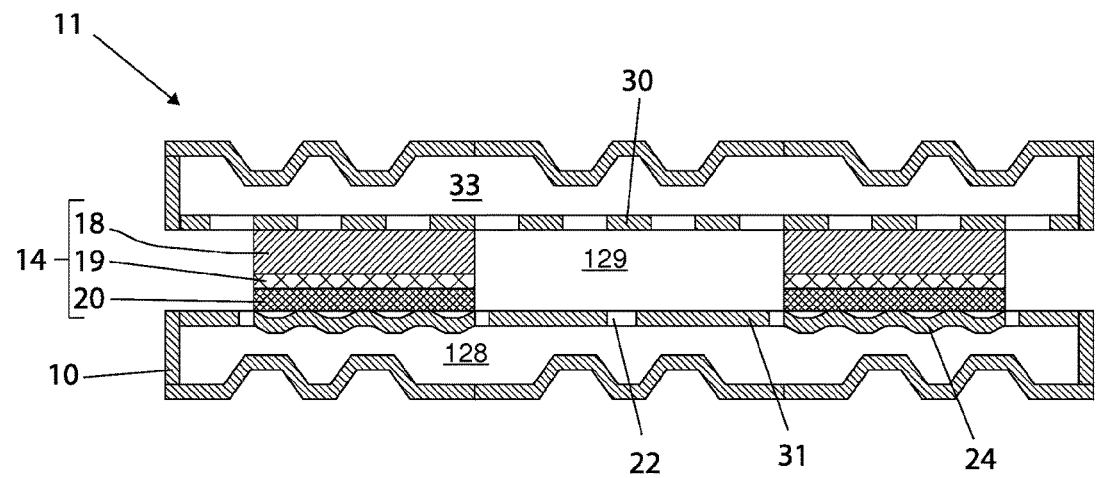

FIG. 7 shows a further variant of the SOEC element 11, in which there is a second conductor 30, and a second gas flow passage 33; this forms part of the gas reaction zone 129 which facilitates the flow of hydrocarbon fuel to the electrolyser anode 18, and facilitates the flow of syngas away from the cells. The second gas flow passage 33 also provides support for the stacking of plural of the elements 11. The electrolyser cathode 20 is in contact with the first conductor 31. In this variant, the flow of hydrocarbon fuel in the second gas flow passage 33 is parallel to the flow of oxygen in the first gas flow passage 128. However, the second gas flow passage 33 may be arranged to have flow at right angles to that of the first gas flow passage 128.

A thick and highly porous anode layer 18 of the SOEC 14 enhances gas flow within the electrode. This can be combined with a thin electrolyte layer 19 to minimise resistive losses at lower operating temperatures. Metal felt may be located between any of the electrodes and the conductors 30, 31 with which they make electrical contact. The felt provides the electrical connection, while improving gas flow to and from the electrode. The use of metal felt can be particularly beneficial at the cathode layer 20 of the SOEC 14, and may allow this layer to be located on a flat region of the wall rather than on peaks or ridges 24.

Figure 8:
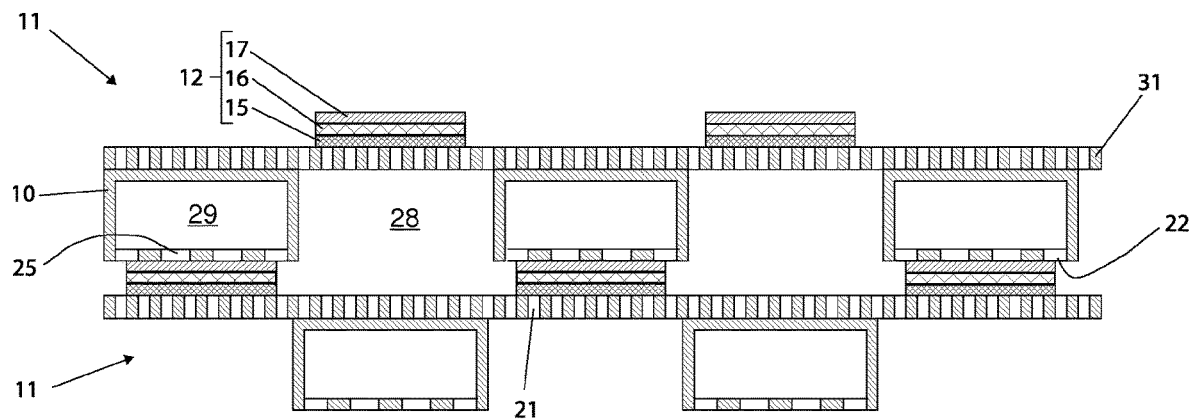
FIGS. 8 to 11 show stacks of respective variants of the element of the hybrid chemical reactor device.

FIG. 8 shows a stack of two further variants of element 11 of the hybrid chemical reactor device, in which the conductor 31 is entirely porous. The conduits 10 have porous regions on the side facing away from the conductor 31. Elements are stacked so that these porous regions of the conduit 10 are in contact with SOFC anode 17 on the element 11 below. The gas passages of the conduits form the second gas zone 29 and thus contain the flow of fuel (reactant), which is supplied via some of the pores 25 of the porous region to the SOFC anode 17. The first gas zone 28 surrounds the conduits and contains the oxidant. Porosity 21 in the conductor 31 allows the oxidant to access the SOFC cathode 15, while other pores 22 of the porous regions of the conduits 10 allow a leakage flow of oxidant to bleed into the conduit 10.

Figure 9:
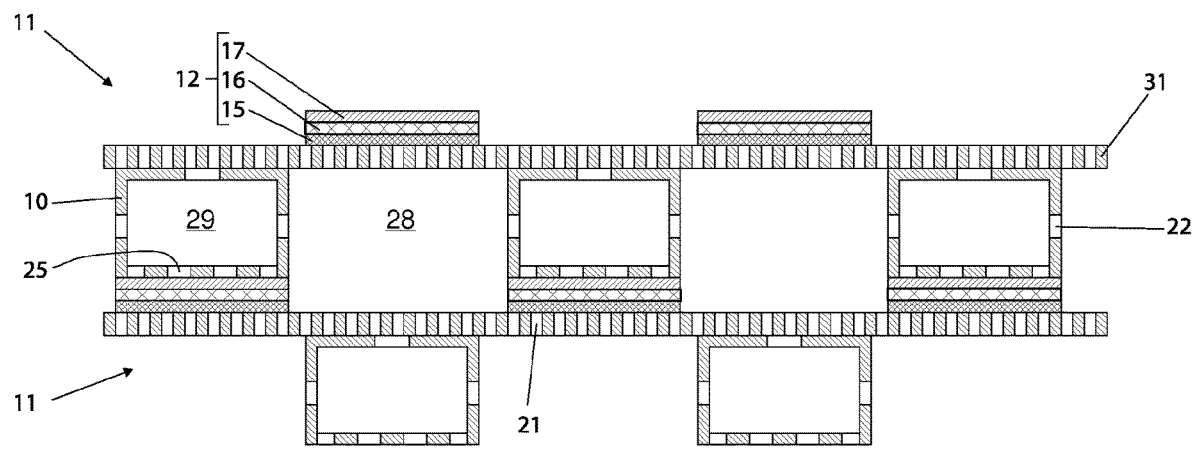

FIG. 9 shows a stack of two further variants of element 11 of the hybrid chemical reactor device, which is similar to FIG. 8, but which has porosity in all four faces of the conduit 10 to allow the oxidant to bleed in through pores 22 in faces of the conduit away from the face in contact with the SOFC anode 17. Entirely porous conduits and conductors may readily be made from ceramic materials.

Figure 10:
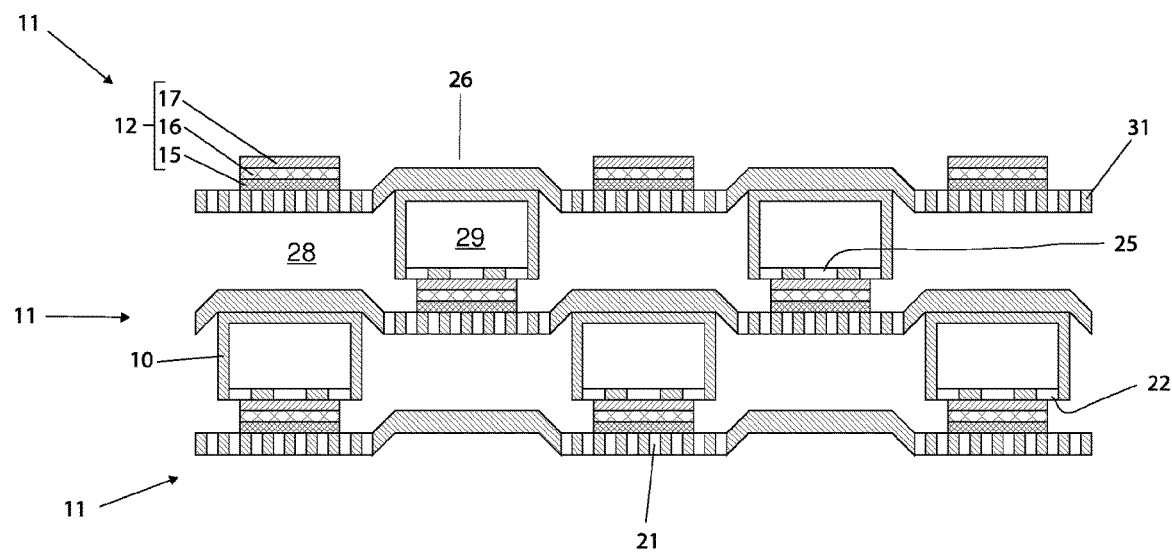

FIG. 10 shows a stack of three further variants of the element 11 of the hybrid chemical reactor device. The conductors 31 have porous regions below the SOFCs 12, but are otherwise non-porous 26. The non-porous regions are shaped so that the conduits 10 fit into the recesses, but they are not connected to each other. The materials of the conductor 31 and conduit 10 need to be compatible with the electrodes they are in contact with. If these materials have different thermal expansion coefficients, then this configuration allows relative movement between the conductors and conduits. Compression of the stack provides good electrical contact, and ensures the conduits 10 are correctly located.

Figure 11:
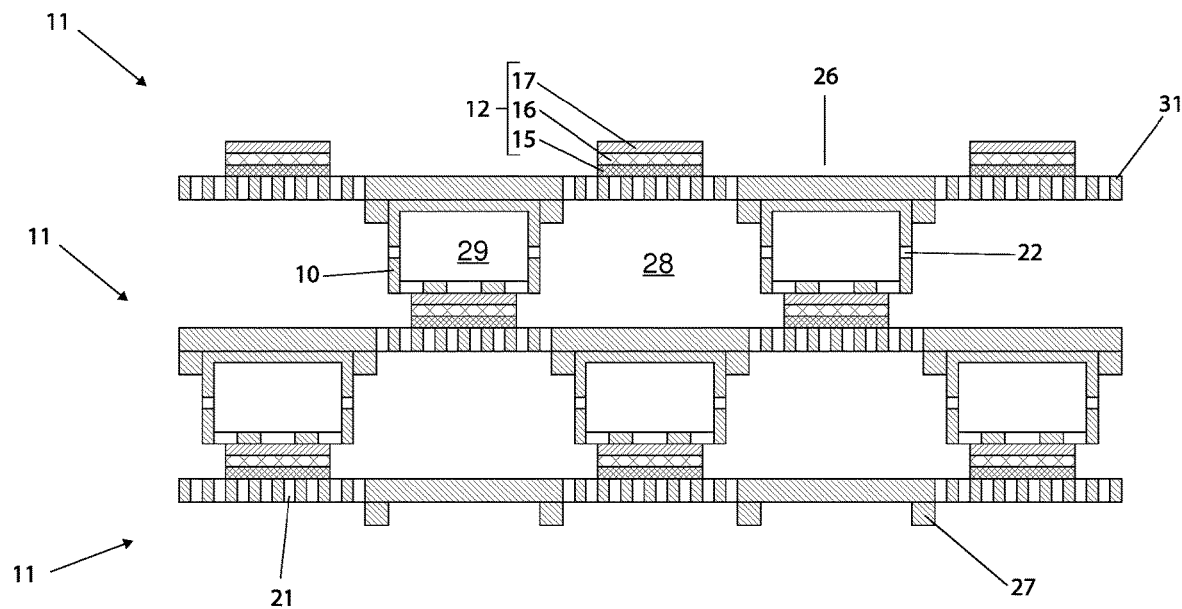

FIG. 11 shows a stack of three further variants of the element 11 of the hybrid chemical reactor device. The conductor 31 is planar, its porous regions 21 are in contact with the SOFCs 12, and the rest of the conductor 31 is non-porous 26. Lugs 27 are attached below the non-porous region 26, to provide a recess to locate the conduit 10. Lugs 27 may be discrete pieces, or long parallel strips of material. Porous regions 22 allow contents of the first gas zone 28 to bleed into the second gas zone 29.

Figure 12:
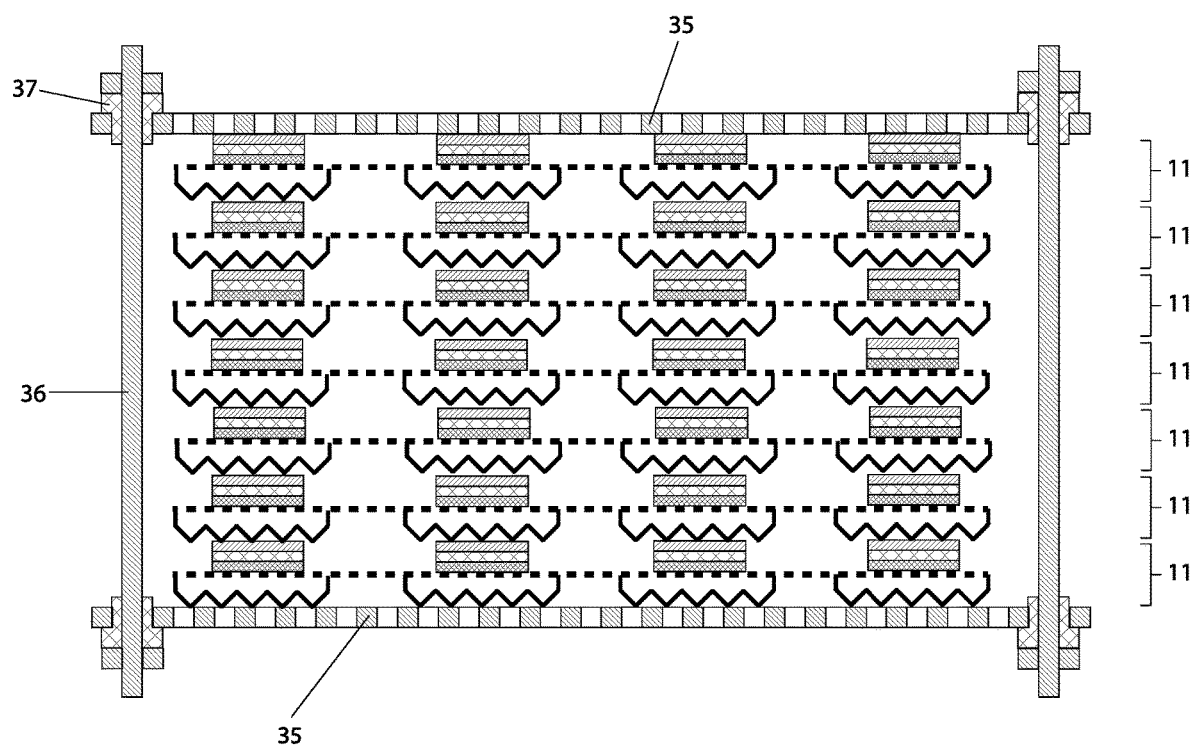
FIG. 12 shows a stack of seven elements forming the hybrid chemical reactor device.

FIG. 12 shows a stack of seven elements 11 forming the hybrid chemical reactor device. This is placed in a housing which contains a flow of reactant gases. At top and bottom of the stack are porous metal end plates 35, allowing the gases to pass through the stack. The conduits contain the oxidant, and the porous regions of the conductors between the conduits, allow gases to pass through the stack at any angle. The porosity disturbs the gas flow, making it more turbulent. Tightening bolts at the ends of rods 36 extending between the end plates 35 exert a clamping load on the elements 11.

Stacking the fuel cell elements connects them in electrical series, and accumulates the voltage. The thickness and composition of the fuel cell layers may change, as the gas or gases that make up the reactant are consumed and the concentrations lowered.

Figure 13:
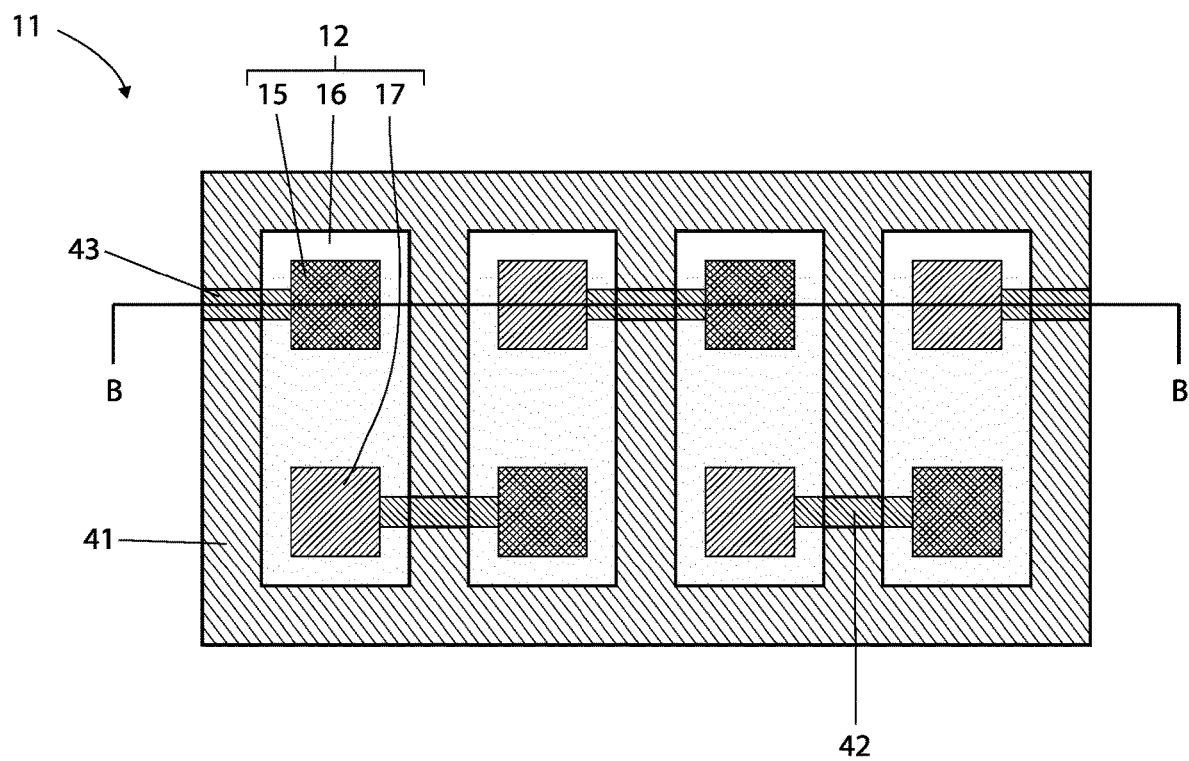
FIG. 13 shows schematically a plan view of an element of a hybrid chemical reactor having planar cells.
Figure 14:
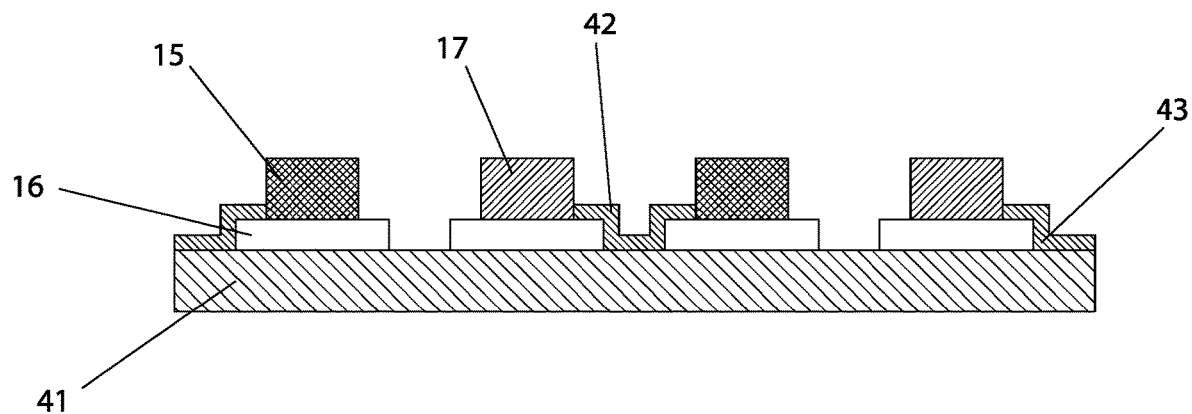
FIG. 14 shows a section on B-B of FIG. 13.

FIGS. 1 to 12 show cells in which the electrodes sandwich the electrolyte. However, it is also possible to form the elements of the hybrid reactor device using planar cells. FIG. 13 shows schematically a plan view of an element 11 of the hybrid chemical reactor having such cells, and FIG. 14 shows a section on B-B of FIG. 13. The element includes a substrate 41 onto which are deposited four SOFCs 12. Each SOFC comprises an electrolyte 16 deposited on the substrate 41, and on the same top surface of the electrolyte 16 are deposited a cathode 15 and an anode 17 in spaced apart relationship. Alternatively, SOECs 14 may be deposited onto the substrate 41 in a similar manner.

The electrical circuits are completed by depositing electrically conducting interconnects. Thus interconnects 42 connect each SOFC cathode 15 with the SOFC anode 17 of an adjacent fuel cell, thus connecting them in series. Conductors 43 allow connection to an external circuit so that a current can be drawn from the fuel cells. The substrate 41 can be an electrical insulator, e.g. a ceramic such as alumina, so that the interconnects 42 and 43 do not short circuit with each other. If the substrate is metallic, such as ferritic stainless steel, then an insulating coating can be applied to the substrate to prevent electrical contact between the interconnects and the substrate.

This planar cell morphology has an advantage that the parts of the element 11 can be deposited by inkjet or 3D printing, and then sintered.

As before, oxidant is supplied to the SOFC cathode 15 at a first gas zone, while the SOFC anode 17 is exposed to the reactant at a second gas zone. Suitable conduits for the supply of these gas flows and the removal of reaction products from the second gas zone are therefore provided, with provision for controlled leakage of oxidant into the reactant gas zone to enable a direct reaction as well as the electrochemical reaction.

As one example, the substrate 41 may take the form of a conduit which is at least partially porous, and supplies oxygen. Each portion of the SOFC electrolyte 16 in contact with the SOFC cathode 15 can then be porous, to allow oxygen to access the cathode.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Moreover, in determining extent of protection, due account shall be taken of any element which is equivalent to an element specified in the claims. Various changes to the described embodiments may be made without departing from the spirit and scope of the invention.

All references referred to above are hereby incorporated by reference.

The invention claimed is:

1. A chemical reactor comprising:
one or more solid oxide fuel cells, each cell having an electrolyte layer joining a cathode and an anode, the one or more fuel cell cathodes being located in a first gas zone of the reactor, and the one or more fuel cell anodes being located in a second gas zone of the reactor;
a first gas supply route for supplying a flow of oxidant to the first gas zone;
a second gas supply route for supplying a flow of reactant to the second gas zone; and
a gas removal route for removing a flow of reaction products away from the second gas zone; and
one or more leakage paths which fluidly connect the first gas zone to the second gas zone such that a leakage flow of oxidant leaks from the first gas zone into the second gas zone to support a direct exothermic chemical reaction between the oxidant and the reactant, while substantially preventing a reverse flow of reactant into the first gas zone;
wherein the reaction products are a mixture of reaction product from the direct reaction and reaction product from an indirect electrochemical oxidation reaction of the reactant at the anode or anodes; and
wherein the reactor further includes a catalyst in the second gas zone for catalysing the direct reaction, and a controller for drawing a controlled electric current from the fuel cell or cells to control the rate of the indirect reaction and thereby the temperature of the catalyst.

2. The chemical reactor according to claim 1, wherein the controller further controls the flow rates of the oxidant and the reactant to respectively the first and second gas zones to control the rate of the direct reaction.

3. The chemical reactor according to claim 1, wherein the oxidant is oxygen.

4. The chemical reactor according to claim 1, wherein the catalyst is a catalyst in the anode or anodes which also catalyses the indirect reaction.

5. The chemical reactor according to claim 1, wherein the catalyst is a first catalyst, and the reactor further includes a second catalyst in the anode or anodes which catalyses the indirect reaction.

6. A chemical reactor comprising:
one or more solid oxide electrolyser cells, each cell having an electrolyte layer joining a cathode and an anode, the one or more electrolyser cells being located in a gas reaction zone of the reactor;
a first gas supply route for supplying a flow of reductant and oxidant gases to the gas reaction zone such that both the cathode and the anode of each cell are exposed to the flow of reductant and oxidant;
a gas removal route for removing a flow of reaction product from the gas reaction zone; and
a second gas supply route for supplying a flow of oxygen to the gas reaction zone such that the oxygen supports a direct exothermic chemical reaction between the oxygen and the reductant gas;
wherein the reaction products are a mixture of reaction product from the direct reaction, reaction product from an indirect electrochemical reduction reaction of the oxidant at the cathode or cathodes, and reaction product from an indirect electrochemical oxidation reaction of the reductant at the anode or anodes; and
wherein the reactor further includes a catalyst in the gas reaction zone for catalysing the direct reaction, and a controller for applying a controlled electric potential to the electrolyser cell or cells to control the rate of the indirect reactions and thereby the temperature of the catalyst.

7. The chemical reactor according to claim 6, the controller further controls the respective flow rates of the reductant gas, oxidant gas and oxygen to the gas reaction zone to control the rate of the direct reaction.

8. The chemical reactor according to claim 6 in which the reductant is hydrocarbon gas, the oxidant is carbon dioxide, and the reaction products are a mixture of hydrogen and carbon monoxide.

9. The chemical reactor according to claim 6, wherein the catalyst is a catalyst in the anode or anodes which also catalyses the indirect oxidation of the reductant gas.

10. The chemical reactor according to claim 6, wherein the catalyst is a first catalyst, and the reactor further includes a second catalyst in the anode or anodes which catalyses the indirect oxidation of the reductant gas.

11. The chemical reactor according to claim 10 in which the first catalyst is coated on surfaces of the reactor.

12. The chemical reactor according to claim 10 in which the first catalyst is incorporated in structural material of the reactor.

13. The chemical reactor according to claim 6 further comprising one or more temperature measuring devices arranged to monitor the reactor temperature, and to communicate the reactor temperature to the controller for use in controlling the rate of the indirect reaction(s).

14. The chemical reactor according to claim 6 further comprising one or more gas composition measuring devices arranged to monitor the composition of the reaction products, and to communicate the composition to the controller for use in controlling the rate of the indirect reaction(s).

15. The chemical reactor according to claim 1 further comprising one or more temperature measuring devices arranged to monitor the reactor temperature, and to communicate the reactor temperature to the controller for use in controlling the rate of the indirect reaction(s).

16. The chemical reactor according to claim 1 further comprising one or more gas composition measuring devices arranged to monitor the composition of the reaction products, and to communicate the composition to the controller for use in controlling the rate of the indirect reaction(s).

17. The chemical reactor according to claim 5 in which the first catalyst is coated on surfaces of the reactor.

18. The chemical reactor according to claim 5 in which the first catalyst is incorporated in structural material of the reactor.

* * * * *